(12) United States Patent
Kaji et al.

(10) Patent No.: US 11,181,706 B2
(45) Date of Patent: Nov. 23, 2021

(54) OPTICAL FIBER CABLE

(71) Applicant: Fujikura Ltd., Tokyo (JP)

(72) Inventors: Tomoaki Kaji, Sakura (JP); Shinnosuke Sato, Sakura (JP); Kouji Tomikawa, Sakura (JP); Ken Osato, Sakura (JP)

(73) Assignee: Fujikura Ltd., Tokyo (JP)

( * ) Notice: Subject to any disclaimer, the term of this patent is extended or adjusted under 35 U.S.C. 154(b) by 39 days.

(21) Appl. No.: 16/612,199

(22) PCT Filed: Dec. 5, 2018

(86) PCT No.: PCT/JP2018/044747
§ 371 (c)(1),
(2) Date: Nov. 8, 2019

(87) PCT Pub. No.: WO2019/124077
PCT Pub. Date: Jun. 27, 2019

(65) Prior Publication Data
US 2021/0141178 A1  May 13, 2021

(30) Foreign Application Priority Data
Dec. 19, 2017 (JP) .............................. JP2017-243186

(51) Int. Cl.
*G02B 6/44* (2006.01)
(52) U.S. Cl.
CPC .......... *G02B 6/4413* (2013.01); *G02B 6/4403* (2013.01)

(58) Field of Classification Search
None
See application file for complete search history.

(56) References Cited

U.S. PATENT DOCUMENTS

| | | | |
|---|---|---|---|
| 4,147,406 A | 4/1979 | Anderson | |
| 6,185,352 B1 | 2/2001 | Hurley | |
| 6,205,277 B1 | 3/2001 | Mathis et al. | |
| 6,295,401 B1 | 9/2001 | Rutterman et al. | |
| 10,345,544 B1 | 7/2019 | Shen | |
| 2016/0041354 A1 | 2/2016 | Guenter et al. | |
| 2017/0293097 A1 | 10/2017 | Ito et al. | |
| 2018/0252884 A1* | 9/2018 | Quinn | G02B 6/4434 |

FOREIGN PATENT DOCUMENTS

| | | |
|---|---|---|
| CN | 87103422 A | 11/1987 |
| CN | 88100242 A | 8/1988 |
| CN | 88100432 A | 8/1988 |

(Continued)

OTHER PUBLICATIONS

Kunming Electric Wire Factory, "Stranded wire production", China Machine Press, Sep. 30, 1980, pp. 79-81 (4 pages).
(Continued)

*Primary Examiner* — Jerry Rahll
(74) *Attorney, Agent, or Firm* — Osha Bergman Watanabe & Burton LLP

(57) ABSTRACT

An optical fiber cable includes: a first aggregate layer including first optical fiber units that are helically twisted together in a first direction without strand-back. Each of the first optical fiber units includes optical fibers twisted together in a second direction. The first direction is different from the second direction.

4 Claims, 5 Drawing Sheets

(56) References Cited

FOREIGN PATENT DOCUMENTS

| | | | |
|---|---|---|---|
| CN | 2648464 Y | 10/2004 |
| CN | 102339662 A | 2/2012 |
| CN | 103109330 A | 5/2013 |
| CN | 104795184 A | 7/2015 |
| CN | 105390213 A | 3/2016 |
| CN | 205176350 U | 4/2016 |
| CN | 105659334 A | 6/2016 |
| CN | 105825934 A | 8/2016 |
| CN | 105900187 A | 8/2016 |
| CN | 205428521 U | 8/2016 |
| CN | 106128644 A | 11/2016 |
| CN | 107003479 A | 8/2017 |
| CN | 107003490 A | 8/2017 |
| CN | 107076954 A | 8/2017 |
| CN | 107209336 A | 9/2017 |
| EP | 0517144 A1 | 12/1992 |
| EP | 1023734 B1 | 3/2004 |
| EP | 3185059 A1 | 6/2017 |
| JP | S60-075811 A | 4/1985 |
| JP | S61-223812 A | 10/1986 |
| JP | H04317010 A | 11/1992 |
| JP | H06-265761 A | 9/1994 |
| JP | H07-234346 A | 9/1995 |
| JP | H08-122594 A | 5/1996 |
| JP | H08-152544 A | 6/1996 |
| JP | H11-072664 A | 3/1999 |
| JP | 2003-303515 A | 10/2003 |
| JP | 2004-014181 A | 1/2004 |
| JP | 2007025400 A | 2/2007 |
| JP | 2007108424 A | 4/2007 |
| JP | 2007-226051 A | 9/2007 |
| JP | 2010-286735 A | 12/2010 |
| JP | 2014-106380 A | 6/2014 |
| JP | 2014-116254 A | 6/2014 |
| JP | 2015-079665 A | 4/2015 |
| JP | 2017-058593 A | 3/2017 |
| WO | 0184203 A1 | 11/2001 |
| WO | 2011/094146 A1 | 8/2011 |
| WO | 2017/047305 A1 | 3/2017 |
| WO | 2017044783 A1 | 3/2017 |

OTHER PUBLICATIONS

Search Report issued in corresponding Chinese Patent Application No. 201880034650.4, dated Jun. 4, 2020 (5 pages).
Notification of Reasons for Refusal issued in Japanese Patent Application No. 2017-243186, dated Jun. 30, 2020 (12 pages).
Telcordia, "Generic Requirements for Optical Fiber and Optical Fiber Cable"; Telcordia Technologies Generic Requirements, GR-20-CORE, Issue 4; Jul. 2013 (184 pages).
International Search Report issued in corresponding International Application No. PCT/JP2018/044747 dated Jan. 8, 2019 (2 pages).

* cited by examiner

OPTICAL FIBER CABLE

CROSS-REFERENCE TO RELATED APPLICATIONS

This is a National Stage application of International Application No. PCT/JP2018/044747 filed Dec. 5, 2018, which claims priority to Japanese Patent Application No. 2017-243186 filed Dec. 19, 2017. These references are incorporated herein by reference in their entirety.

TECHNICAL FIELD

The present invention relates to an optical fiber cable.

BACKGROUND

In the related art, an optical power cable as disclosed in Patent Document 1 has been known. The optical fiber cable includes a first cable core, a second cable core, and a sheath that accommodates the cable cores. The first cable core is formed by SZ-twisting a plurality of optical fibers. The second cable core is formed by helically twisting a plurality of optical fibers together around the first cable core.

PATENT LITERATURE

[Patent Document 1] Japanese Unexamined Patent Application, First Publication No. 2014-106380

In this type of optical fiber cable, it is required to suppress the untwisting of a plurality of optical fiber units, and the untwisting of a plurality of optical fibers included in the optical fiber units.

SUMMARY

One or more embodiments of the present invention provide an optical fiber cable which limits the untwisting of a plurality of optical fiber units and the untwisting of a plurality of optical fibers included in these optical fiber units.

An optical fiber cable according to one or more embodiments of the present invention includes a first aggregate layer including a plurality of first optical fiber units that are helically twisted together in a first direction without strand-back, and each of the plurality of first optical fiber units has a plurality of optical fibers twisted together in a second direction, and the first direction and the second direction are different from each other.

According to the above-described embodiments of the present invention, it is possible to provide an optical fiber cable which limits the untwisting of a plurality of optical fiber units and the untwisting of a plurality of optical fibers included in these optical fiber units.

DETAILED DESCRIPTION

The configuration of an optical fiber cable according to one or more embodiments will be described below with reference to FIG. 1. In addition, the present invention is not limited to the following embodiments.

Figure 1:
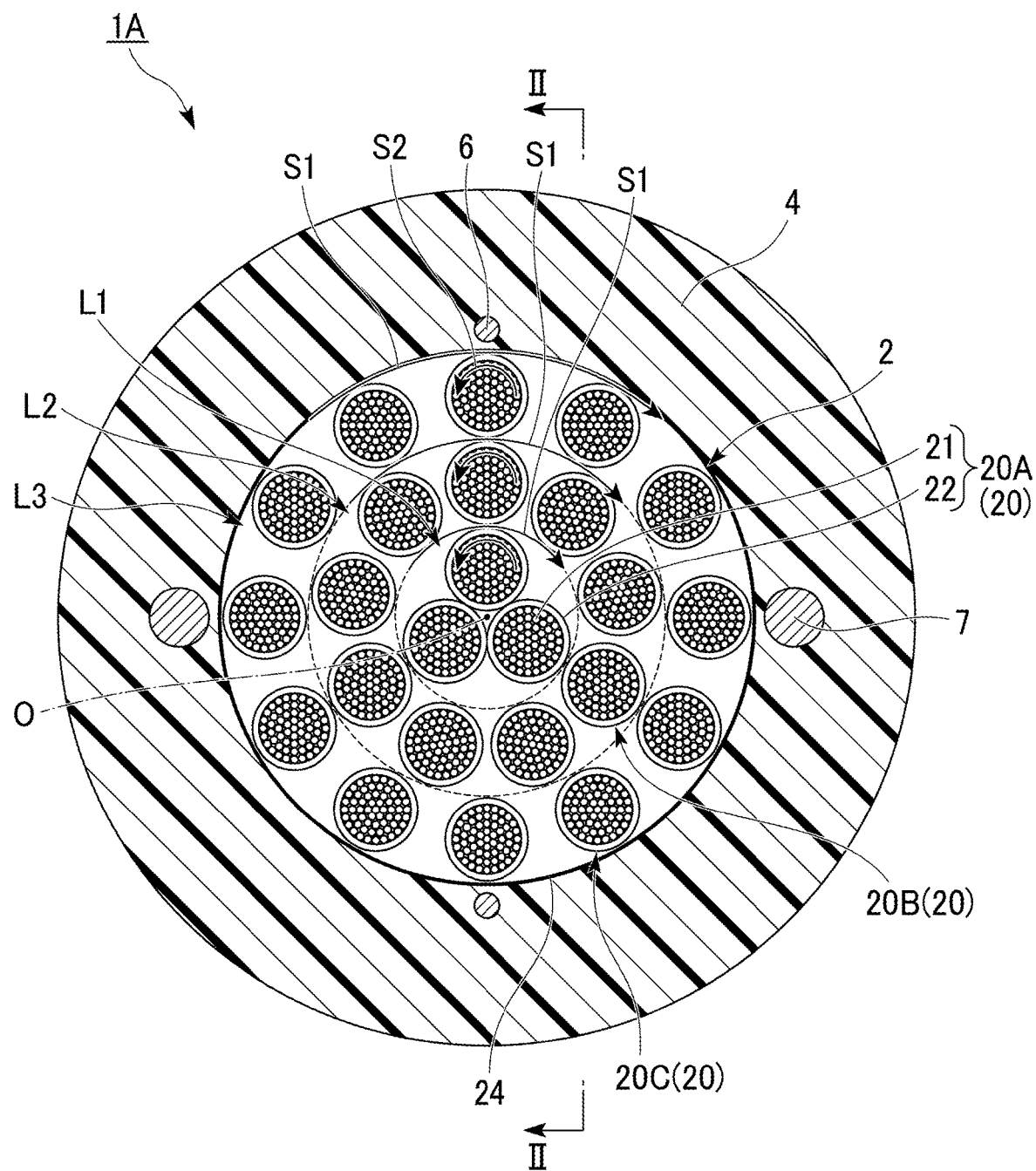
FIG. 1 is a transverse cross-sectional view showing the structure of an optical fiber cable according to one or more embodiments.

As shown in FIG. 1, an optical fiber cable 1A includes a core 2 in which a plurality of optical fibers 21 are assembled, a sheath 4 that accommodates the core 2 therein, and a pair of rip cords 6 and a pair of tension members 7, which are embedded in the sheath 4.

(Direction Definition)

Here, according to one or more embodiments, the sheath 4 is formed in a cylindrical shape having a central axis O, and the optical fibers 21 extend along the central axis O.

According to one or more embodiments, a direction along the central axis O is referred to as a longitudinal direction. The cross-section perpendicular to the central axis O is referred to as a transverse cross-section. Further, in the transverse cross-sectional view, a direction intersecting the central axis O is referred to as a radial direction, and a direction revolving around the central axis O is referred to as a circumferential direction.

As the material of the sheath 4, polyolefin (PO) resin such as polyethylene (PE), polypropylene (PP), ethylene ethyl acrylate copolymer (EEA), ethylene vinyl acetate copolymer (EVA), and ethylene propylene copolymer (EP), polyvinyl chloride (PVC), or the like can be used.

In the transverse cross-sectional view, the inner peripheral surface and the outer peripheral surface of the sheath 4 are formed in a concentric shape with the central axis O as a center. Thus, the thickness of the sheath 4 in the radial direction is substantially uniform in the circumferential direction.

A pair of rip cords 6 sandwiches the core 2 in the radial direction, and extends in the longitudinal direction in parallel to the core 2. The number of rip cords 6 embedded in the sheath 4 may be one or three or more.

As the material of the rip cord 6, for example, a cylindrical rod made of PP, nylon, or the like can be used. Further, the rip cord 6 may be formed of yarns in which fibers such as PP or polyester are twisted, which makes the rip cord 6 have water absorbency.

A pair of tension members 7 sandwiches the core 2 in the radial direction, and extends in the longitudinal direction in parallel to the core 2. The number of tension members 7 embedded in the sheath 4 can be appropriately changed.

As the material of the tension member 7, for example, a metal wire (such as steel wire), a tension fiber (such as aramid fiber), FRP or the like can be used.

(Core)

The core 2 has a first aggregate layer L1 located at the center in the radial direction, a second aggregate layer L2 located outside the first aggregate layer L1 in the radial direction, and a third aggregate layer L3 located outside the second aggregate layer L2 in the radial direction. That is, the core 2 has a plurality of aggregate layers L1 to L3. According to one or more embodiments, the third aggregate layer L3 is the outermost aggregate layer located on the radially outermost side, among the plurality of aggregate layers L1 to L3.

The plurality of aggregate layers L1 to L3 each include a plurality of optical fiber units 20. Hereinafter, the optical fiber units 20 included in the aggregate layers L1 to L3 may be referred to as a first optical fiber unit 20A, a second optical fiber unit 20B, and a third optical fiber unit 20C, respectively.

The core 2 has a wrapping tube 24 that wraps the third aggregate layer L3. The wrapping tube 24 may be made of a material having water absorbency, such as a water absorbing tape, for example.

The sectional shapes of the core 2 and each optical fiber unit 20 according to one or more embodiments are a circle, but without being limited thereto, it may be a non-circular shape such as an elliptical shape. Further, the core 2 may not be provided with the wrapping tube 24.

(Optical Fiber Unit)

Figure 2:
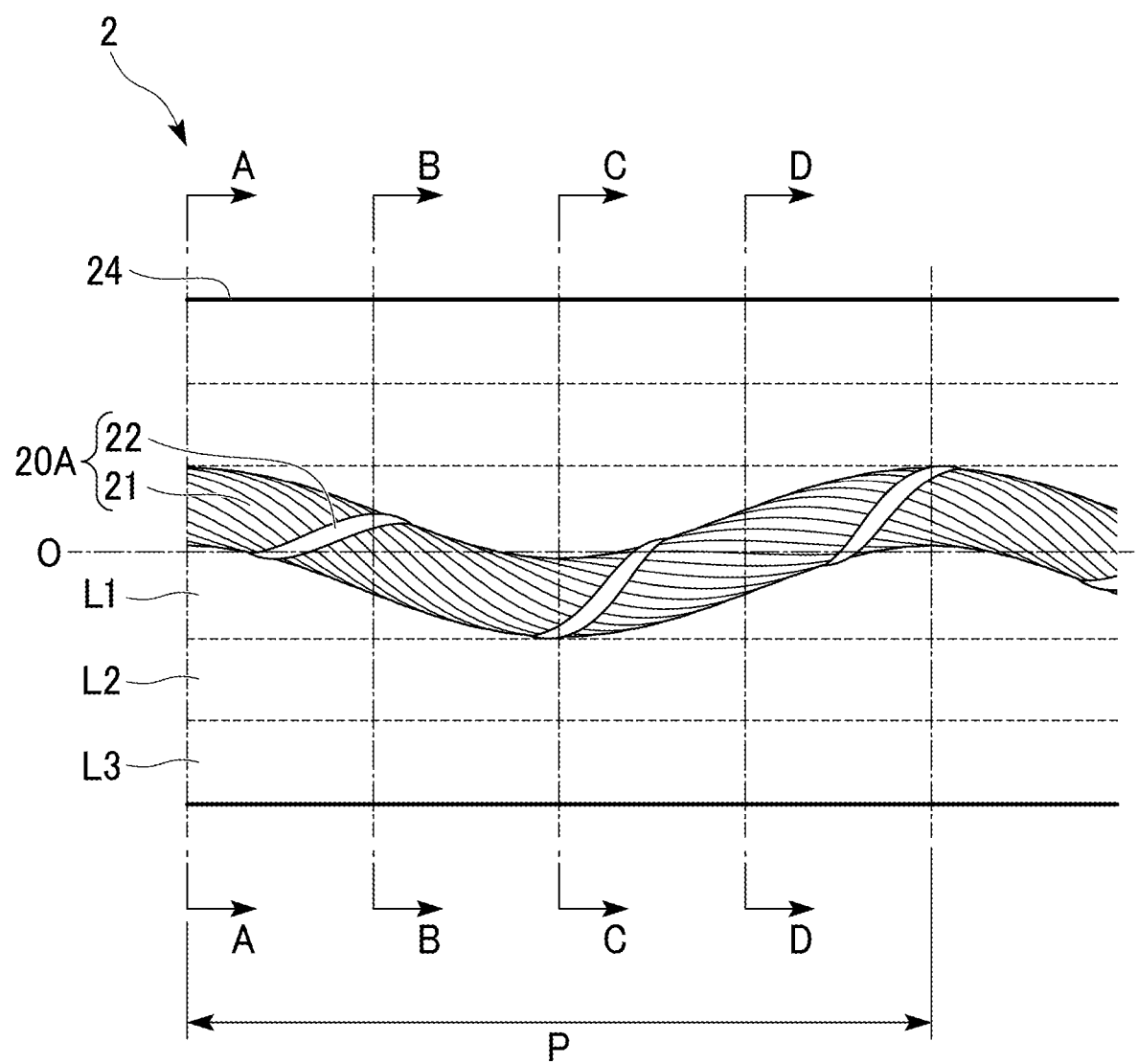
FIG. 2 is an explanatory view when one first optical fiber unit included in a first aggregate layer is viewed from a cross-section II-II of FIG. 1.

As shown in FIGS. 1 and 2, each optical fiber units 20 included in the core 2 includes a plurality of optical fibers 21, and a bundle 22 bundling the plurality of optical fibers 21. According to one or more embodiments, the configurations of the first optical fiber unit 20A, the second optical fiber unit 20B, and the third optical fiber unit 20C are the same as each other. However, the configurations of the optical fiber units 20A to 20C may be different from each other.

As the optical fiber 21, an optical fiber core wire, an optical fiber strand, or the like can be used. According to one or more embodiments, as the plurality of optical fibers 21, an intermittently-fixed optical fiber ribbon is used. The intermittently-fixed optical fiber ribbon has a structure in which the plurality of optical fibers 21 are intermittently connected by a plurality of connecting portions. In the intermittently-fixed optical fiber ribbon, when optical fibers 21 are pulled in a direction orthogonal to the extending direction thereof, the optical fibers 21 are fixed to each other so as to spread in a mesh form (spider web shape).

The mode of the optical fiber 21 included in the optical fiber unit 20 is not limited to the intermittently-fixed optical fiber ribbon, and may be changed as appropriate. Further, the number of optical fibers 21 included in the optical fiber unit 20 can be appropriately changed.

(First Aggregate Layer)

The first aggregate layer L1 is formed by helically twisting the three first optical fiber units 20A together in the first direction S1, "without strand-back" described later. In the example of FIG. 1, the first direction S1 is clockwise rotation. The plurality of optical fibers 21 included in the first optical fiber unit 20A are twisted together in the second direction S2. In the example of FIG. 1, the second direction S2 is counterclockwise rotation.

As described above, according to one or more embodiments, the first direction S1 and the second direction S2 are different from each other.

Next, the state of twist in a so-called "without strand-back" will be described using FIG. 2 and parts (a) to (d) of FIG. 3.

FIG. 2 is an explanatory view when one first optical fiber unit 20A is viewed from a cross-section II-II of FIG. 1. The parts (a) to (d) in FIG. 3 are cross-sectional views of the optical fiber unit 20, respectively, and the corresponding positions in a longitudinal direction are different from each other by ¼ of the twist pitch P. In FIG. 2, the illustration of the components other than one first optical fiber unit 20A is omitted. In the parts (a) to (d) in FIG. 3, illustration of components other than one optical fiber unit 20 of each aggregate layer L is omitted.

As shown in FIG. 2, the plurality of optical fibers 21 included in the first optical fiber unit 20A are helically twisted together. The first optical fiber unit 20A helically extends around the central axis O while changing the position in the circumferential direction along the longitudinal direction (see parts (a) to (d) of FIG. 3). When the position of the first optical fiber unit 20A in the circumferential direction changes 360°, the distance in the longitudinal direction is the twist pitch P of the first optical fiber unit 20A. The dimension P in the longitudinal direction shown in FIG. 2 indicates the twist pitch P of the first optical fiber unit 20A. The twist pitch P is, for example, about 700 mm.

Figure 3:
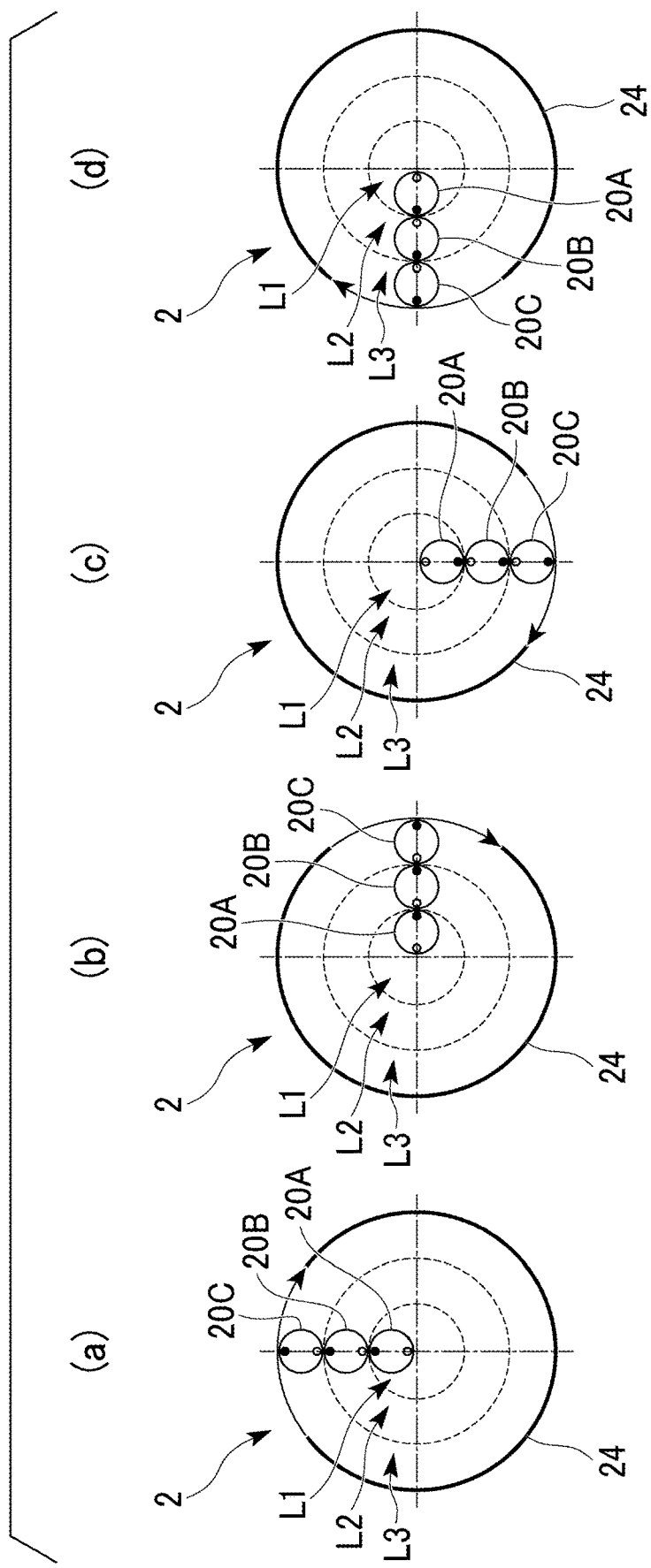
FIG. 3 has a part (a) which is a cross-sectional view taken along line A-A in FIG. 2, a part (b) which is a cross-sectional view taken along line B-B in FIG. 2, a part (c) which is a cross-sectional view taken along line C-C in FIG. 2, and a part (d) which is a cross-sectional view taken along line D-D in FIG. 2.

In FIG. 3, first, a description will be given focusing on one first optical fiber unit 20A. In the parts (a) to (d) in FIG. 3, based on the state before the first optical fiber units 20A are twisted together, the radially outer portion of the first optical fiber unit 20A is indicated by a black circle, and the radially inner portion of the first optical fiber unit 20A is indicated by a white circle.

Comparing the part (a) with the part (b) in FIG. 3, the positions of the first optical fiber unit 20A are different by 90° in the circumferential direction. However, the black circles locate in the radially outer portion and the positions of the black circles are not changed in the radial direction, and the white circles locate in the radially inner portion and the positions of the white circles are not changed in the radial direction. Similarly, even in the parts (c) and (d) of FIG. 3, the positions of the first optical fiber unit 20A in the circumferential direction are different, but the positions of the black circles and the white circles in the radial direction are not changed. In other words, a 360° torsion (a 360° helical twist) is applied to the first optical fiber unit 20A in one cycle of the twist pitch P. This is because when the first optical fiber units 20A are twisted together, the pitch (the revolution cycle) in which the first optical fiber unit 20A revolves around the central axis O and the pitch (the rotation cycle) in which the first optical fiber unit 20A itself rotates (torsions) around its central axis are substantially coincident with each other, and the twist directions of the revolution and the rotation are coincident with each other. Further, in the parts (a) to (d) in FIG. 3, similarly to the first optical fiber unit 20A, in the second optical fiber unit 20B and the third optical fiber unit 20C, the revolution cycle and the rotation cycle are substantially coincident with each other, and the twist directions of revolution and rotation are coincident with each other.

As described above, in the plurality of optical fiber units 20 that are helically twisted, the twist state in which the revolution cycle and the rotation cycle are substantially coincident with each other and the twist directions of revolution and rotation are coincident with each other is referred to as "without strand-back". On the contrary, a twist state in which the revolution cycle and the rotation cycle are not coincident with each other is referred to as "with strand-back".

(Second Aggregate Layer)

As shown in FIG. 1, the second aggregate layer L2 is formed by nine second optical fiber units 20B helically twisted in the first direction S1 so as to surround the first aggregate layer L1. The second optical fiber units 20B are twisted together without strand-back.

The number of the second optical fiber units 20B included in the second aggregate layer L2 may be appropriately changed. The plurality of optical fibers 21 included in the second optical fiber unit 20B are twisted together in the second direction S2.

(Third Aggregate Layer)

As shown in FIG. 1, the third aggregate layer L3 is formed by twelve third optical fiber units 20C helically twisted in the first direction S1 so as to surround the second aggregate layer L2.

The third optical fiber units 20C are twisted together without strand-back.

The number of the third optical fiber units 20C included in the third aggregate layer L3 may be appropriately changed. The plurality of optical fibers 21 included in the third optical fiber unit 20C are twisted together in the second direction S2.

As described above, the optical fiber cable 1A according to one or more embodiments has a plurality of first optical fiber units 20A that are helically twisted together without strand-back in the first direction S1 (clockwise rotation). Therefore, the first optical fiber units 20A tend to untwist counterclockwise. On the other hand, in the first optical fiber unit 20A, a plurality of optical fibers 21 are helically twisted together in the second direction S2 (counterclockwise rotation). Therefore, in the first optical fiber unit 20A, the optical fibers 21 tend to untwist clockwise.

As described above, according to one or more embodiments, the direction in which the optical fibers 21 tend to untwist in the first optical fiber unit 20A and the direction in which the first optical fiber units 20A tend to untwist are opposite. Therefore, in the first aggregate layer L1, the forces that the optical fibers 21 tend to untwist and the forces that the first optical fiber units 20A tend to untwist are mutually cancelled. Thus, it is possible to suppress the untwisting of the first optical fiber units 20A and the untwisting of the optical fibers 21 in the first optical fiber unit 20A.

Similarly, even in the second aggregate layer L2 and the third aggregate layer L3, the twist direction of the optical fiber units 20 and the twist direction of the optical fibers 21 are opposite to each other, so the untwisting can be suppressed.

Since the untwisting of the second optical fiber units 20B included in the second aggregate layer L2 is suppressed, it is likely to maintain the state in which the second aggregate layer L2 covers the first aggregate layer L1. This suppresses an increase in transmission loss. Because, for example, the first optical fiber units 20A are prevented from exposing to the outside in a radial direction of the second aggregate layer L2 and when the sheath 4 is formed, or thereafter, the optical fibers 21 included in the first optical fiber units 20A are prevented from bending locally.

Further, the force that the optical fibers 21 in the optical fiber unit 20 tend to untwist acts as a force for tightening the twist of the optical fiber units 20. Therefore, the structure of the twist of the optical fiber units 20 archives to tighten all the aggregate layers L1 to L3. Therefore, it is possible to accommodate the optical fibers 21 in the high density in the sheath 4, and the diameter of the optical fiber cable 1A can be reduced.

In addition, since untwisting of the optical fiber units 20 is unlikely to occur, when the optical fiber cable 1A is manufactured, the twisted state can be kept good without strictly controlling the winding state of the wrapping tube 24. Therefore, the manufacturing efficiency of the optical fiber cable 1A can be improved.

Next, one or more embodiments of the present invention where the basic configuration is the same as that of the embodiments described above will be described. Therefore, the same reference numerals are given to similar configurations, an explanation thereof will be omitted, and only differences therefrom will be described.

Figure 4:
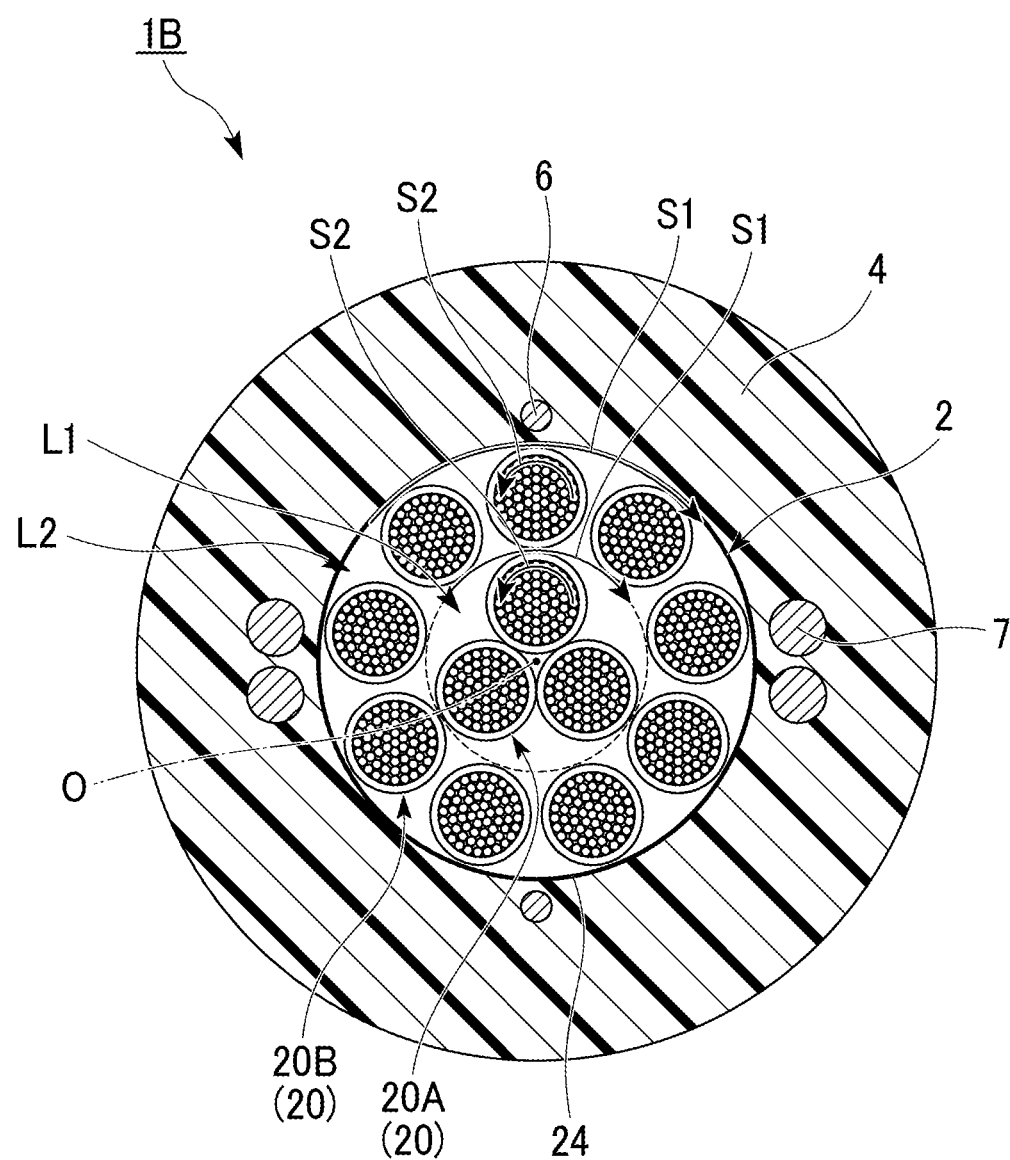
FIG. 4 is a transverse cross-sectional view showing the structure of an optical fiber cable according to one or more embodiments.

As shown in FIG. 4, in an optical fiber cable 1B according to one or more embodiments, the core 2 has two aggregate layers L1, L2. The second aggregate layer L2 is wrapped by the wrapping tube 24.

The twist direction of the optical fiber units 20 included in the first and second aggregate layers L1 and L2 is the first direction S1. The twist direction of the optical fibers 21 included in each optical fiber unit 20 is the second direction S2. According to one or more embodiments, the second aggregate layer L2 is the outermost aggregate layer located on the radially outermost side.

The same effects as those of the previously described embodiments can be obtained also in the optical fiber cable 1B according to one or more embodiments.

Next, one or more embodiments of the present invention where the basic configuration is the same as that of the embodiments described above will be described. Therefore, the same reference numerals are given to similar configurations, an explanation thereof will be omitted, and only differences therefrom will be described.

Figure 5:
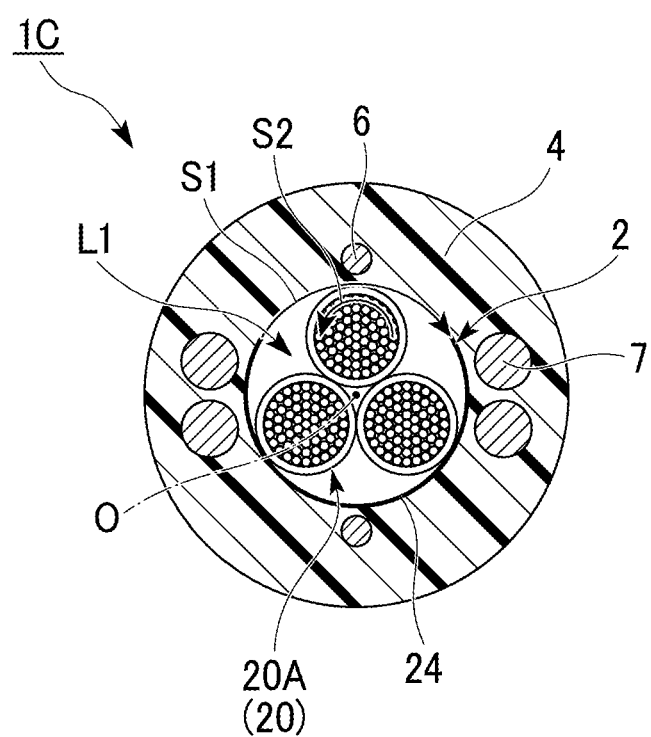
FIG. 5 is a transverse cross-sectional view showing the structure of an optical fiber cable according to one or more embodiments.

As shown in FIG. 5, in an optical fiber cable 1C according to one or more embodiments, the core 2 has one aggregate layer L1. The first aggregate layer L1 is wrapped by the wrapping tube 24.

In one or more embodiments, the twist direction (second direction S2) of the plurality of first optical fiber units 20A and the twist direction (first direction S1) of the optical fibers 21 in the first optical fiber unit 20A are different from each other, so it is possible to suppress the untwisting.

EXAMPLE

Next, the results of examining the effect of the twist state of the optical fiber unit 20 on the transmission loss of light will be described. In the present example, the optical fiber cables of the samples A to K shown in Table 1 below are prepared. In addition, an example described below is only a specific example of the above embodiments, and the present invention is not limited to the following example.

TABLE 1

| | Sample | A | B | C | D | E | F | G | H | I | J | K |
|---|---|---|---|---|---|---|---|---|---|---|---|---|
| Twist direction | First aggregate layer L1 | S2 | S1 | S2 | S2 | S1 | S1 | S1 | S1 | S1 | S2 | S1 |
| | Second aggregate layer L2 | S2 | S1 | S1 | S2 | S1 | S1 | S2 | S1 | S1 | S2 | S1 |
| | Third aggregate layer L3 | — | — | — | S2 | S1 | S2 | S2 | S1 | S1 | S2 | S1 |

TABLE 1-continued

| | Sample | A | B | C | D | E | F | G | H | I | J | K |
|---|---|---|---|---|---|---|---|---|---|---|---|---|
| Strand-back | First aggregate layer L1 | N | N | N | N | N | N | N | N | N | Y | Y |
| | Second aggregate layer L2 | N | N | N | N | N | N | N | N | N | Y | Y |
| | Third aggregate layer L3 | — | — | — | N | N | N | N | N | N | Y | Y |
| Twist pitch | First aggregate layer L1 | 1 | 1 | 1 | 1 | 1 | 1 | 1 | 1 | 1 | 1 | 1 |
| | Second aggregate layer L2 | 1 | 1 | 1 | 1 | 1 | 1 | 1 | 1 | 1 | 1 | 1 |
| | Third aggregate layer L3 | — | — | — | 1 | 1 | 1 | 1 | 0.5 | 2 | 1 | 1 |
| Optical fiber exposure | | NG | OK | NG | NG | OK | NG | NG | OK | NG | OK | NG |
| Transmission loss | | NG | OK | NG | NG | OK | NG | NG | NG | NG | NG | NG |

The "twist direction" field of Table 1 shows the twist directions of the optical fiber units 20 in each of the aggregate layers L1 to L3. For example, in the case of the sample A, the optical fiber units of the first aggregate layer L1 are twisted together in the second direction S2, and the optical fiber units of the second aggregate layer L2 are twisted together in the second direction S2 as well.

In all the optical fiber units 20 included in each of the aggregate layers L1 to L3 in Table 1, the optical fibers 21 are twisted together in the second direction S2.

The "strand-back" field of Table 1 shows the presence or absence of the above-described strand-back in each of the aggregate layers L1 to L3. "N" indicates "without strand-back", and "Y" indicates "with strand-back".

The "twist pitch" field of Table 1 shows the ratio of the twist pitch P of the optical fiber units 20 in each of the aggregate layers L1 to L3. For example, in a sample D, the twist pitches P in the aggregate layers L1 to L3 are the same as each other. On the other hand, in a sample H, the twist pitches P of the first aggregate layer L1 and the second aggregate layer L2 are the same, but the twist pitch P of the third aggregate layer L3 is half (0.5 times) of the twist pitch P of the first aggregate layer L1.

The field of "optical fiber exposure" in Table 1 represents whether or not the optical fiber unit of the inner aggregate layer is exposed to the outside of the outermost aggregate layer, when each of the aggregate layers L1 to L3 is formed. "OK" is described as a good result in the case where the inner aggregate layer is not exposed, and "NG" is described as a bad result in a case where the inner aggregate layer is exposed. In the case of the samples A to C, the second aggregate layer L2 is the outermost aggregate layer, and it is determined whether or not the first aggregate layer L1 is exposed to the outside of the second aggregate layer L2. In the case of the samples D to K, the third aggregate layer L3 is the outermost aggregate layer, and it is determined whether or not the second aggregate layer L2 is exposed to the outside of the third aggregate layer L3.

The field of "transmission loss" in Table 1 represents the result of measurement of the transmission loss of light after an optical fiber cable is created by covering the core 2 of each of the samples A to K with the sheath 4. In the present example, the transmission loss at a wavelength of 1550 nm is measured by an Optical Time Domain Reflectometer (OTDR), "OK" is described as a good result in a case where the maximum value of transmission loss is 0.25 dB/km or less, and "NG" is described as a bad result in a case where the maximum value exceeds 0.25 dB/km. The maximum value of transmission loss of light of the optical fiber cable (0.25 dB/km or less at 1550 nm) is set in accordance with the Telcordia Technologies Generic Requirements GR-20-CORE standard.

<Samples A to C>

The cores 2 of the samples A to C have two aggregate layers L1 and L2 as shown in FIG. 4. The first aggregate layer L1 includes three optical fiber units 20, and the second aggregate layer L2 includes nine optical fiber units 20. Each optical fiber unit 20 has twelve intermittently-fixed optical fiber ribbons each having twelve optical fibers 21. In other words, each optical fiber unit 20 has 144 optical fibers 21. In addition, since each of the samples A to C has twelve optical fiber units 20, a total of 1,728 optical fibers 21 are provided.

As shown in Table 1, with respect to the sample A, the results of "optical fiber exposure" and "transmission loss" are bad. This is considered to be because untwisting occurs, since the twist direction (second direction S2) of the optical fiber units 20 in each of the aggregate layers L1 and L2 and the twist direction (second direction S2) of the optical fibers 21 included in the optical fiber unit 20 are coincident with each other. That is, a large gap is generated between the second optical fiber units 20B due to the untwisting in the second aggregate layer L2. Then, since the untwisting occurs in the first aggregate layer L1, the loosened first optical fiber unit 20A is exposed through the gap between the second optical fiber units 20B. At this time, the shape of the first optical fiber unit 20A becomes partially unnaturally bent. When the core 2 in this state is covered with the sheath 4, the optical fibers 21 included in the first optical fiber unit 20A are bent, so the transmission loss of light increases.

On the other hand, in the sample B, the twist direction (first direction S1) of the optical fiber units 20 and the twist direction (second direction S2) of the optical fibers 21 included in the optical fiber unit 20 are different from each other. Therefore, the force for untwisting the optical fiber units 20 and the force for untwisting optical fibers 21 are cancelled, so the occurrence of the untwisting can be suppressed. Therefore, since the phenomenon described in the sample A can be suppressed, it is considered that good results can be obtained in both "optical fiber exposure" and "transmission loss".

With respect to the sample C, in the first aggregate layer L1, the twist direction (second direction S2) of the optical fiber units 20 and the twist direction (second direction S2) of the optical fibers 21 are coincident with each other. Therefore, it is considered that the effect of suppressing the occurrence of untwisting is insufficient and good results are not obtained for "optical fiber exposure" and "transmission loss".

<Samples D to K>

The cores 2 of the samples D to K have three aggregate layers L1 to L3 as shown in FIG. 1.

The first aggregate layer L1 includes three optical fiber units 20, the second aggregate layer L2 includes nine optical fiber units 20, and the third aggregate layer L3 includes twelve optical fiber units 20. Each optical fiber unit 20 has the same configuration as that of the samples A to C, and each optical fiber unit 20 has 144 optical fibers 21. In addition, since each of the samples D to K has 24 optical fiber units 20, a total of 3,456 optical fibers 21 are provided.

With respect to the sample D, the results of "optical fiber exposure" and "transmission loss" are bad. This is considered to be because the twist direction of the optical fiber units 20 and the twist direction of the optical fibers 21 are coincident with each other in all the aggregate layers L1 to L3, as in the case of the sample A.

On the other hand, the results of "optical fiber exposure" and "transmission loss" are good for the sample E. This is considered to be because the occurrence of untwisting is suppressed because the twist direction of the optical fiber units 20 and the twist direction of the optical fibers 21 are different from each other in all the aggregate layers L1 to L3, as in the case of the sample B.

With respect to the samples F and G, the twist direction of the optical fiber units 20 and the twist direction of the optical fibers 21 are coincident with each other in some aggregate layers. Therefore, as in the sample C, the effect of suppressing the untwisting is insufficient, and it is considered that the results of "optical fiber exposure" and "transmission loss" are bad.

With respect to the sample H, the twist direction of the optical fiber units 20 and the twist direction of the optical fibers 21 are different from each other in all the aggregate layers L1 to L3, and the result of "optical fiber exposure" is good. However, the result of "transmission loss" is bad. This is considered to be because the twist pitch P of the third aggregate layer L3 is half of the twist pitch P of the other aggregate layers L1 and L2 and is excessively small. In other words, since the third optical fiber units 20C are twisted together with a small twist pitch P, it is considered that the side pressure which the third optical fiber unit 20C gives on the inner optical fiber units 20B, 20A becomes large, which increases the transmission loss of light.

With respect to the sample I, the twist direction of the optical fiber units 20 and the twist direction of the optical fibers 21 are different from each other in all the aggregate layers L1 to L3, and the results of "optical fiber exposure" and "transmission loss" are bad. This is considered to be because the twist pitch P of the third aggregate layer L3 is twice the twist pitch P of the other aggregate layers L1 and L2 and is excessively large.

In other words, since the third optical fiber units 20C are twisted together with a large twist pitch P, it is considered that the effect of the third optical fiber unit 20C to retain the shape of the second optical fiber unit 20B becomes small, and the second optical fiber unit 20B is exposed. As a result of forming the sheath 4 in a state where the second optical fiber unit 20B is exposed, it is considered that the optical fibers 21 included in the second optical fiber unit 20B are unnaturally bent, which increases the transmission loss of light.

With respect to the samples J and K, the optical fiber units 20 are twisted with strand-back in all the aggregate layers L1 to L3. In a case where the optical fiber units 20 are twisted with strand-back, the side pressure applied to the optical fibers 21 included in each optical fiber unit 20 increases, which increases the transmission loss of the light. As a result, it is considered that the result of "transmission loss" is bad.

The above results are summarized.

From the results of the samples A to G, the twist direction of the optical fiber units 20 and the twist direction of the optical fibers 21 may be different from each other in all the aggregate layers L1 to L3 included in the core 2.

From the results of the samples H and I, the twist pitches P of the optical fiber units 20 included in each of the aggregate layers L1 to L3 may be equal to each other.

From the results of samples J and K, the optical fiber units 20 may be twisted together without strand-back.

The above results are considered to be the same in a case where four or more aggregate layers are included in the core 2.

Next, the results of examining the influence of the ratio of the cross-sectional areas of the optical fiber units 20 included in the respective aggregate layers L1 to L3 on the optical fiber exposure will be described. In the present example, as shown in Table 2 below, samples L to P having different numbers of optical fiber units 20 included in each of the aggregate layers L1 to L3 are created.

TABLE 2

| Sample | | L | M | N | O | P |
|---|---|---|---|---|---|---|
| Number of optical fiber units | First aggregate layer | 3 | 3 | 3 | 3 | 3 |
| | Second aggregate layer | 10 | 9 | 8 | 7 | 6 |
| | Third aggregate layer | 11 | 12 | 13 | 14 | 15 |
| Cross-sectional area ratio R | | 0.8 | 1.0 | 1.2 | 1.4 | 1.7 |
| Optical fiber exposure | | NG | OK | OK | OK | NG |

The "cross-sectional area ratio R" shown in Table 2 is calculated by $R = Ao \div Ai$. Ao is the sum of the cross-sectional areas of the optical fiber units 20 included in the outermost aggregate layer. Ai is the sum of the cross-sectional areas of the optical fiber units 20 included in the aggregate layers other than the outermost aggregate layer. Here, the optical fiber units 20 included in each of the aggregate layers L1 to L3 have the same configuration as each other and have the same cross-sectional area. Therefore, the above "cross-sectional area ratio R" can be calculated by the number of optical fiber units 20 in each aggregate layer.

For example, in the sample L, the number of optical fiber units 20 included in the outermost aggregate layer (aggregate layer L3) is 11, and the number of plurality of optical fiber units 20 included in the aggregate layers (aggregate layers L1 and L2) other than the outermost aggregate layer is 13. Therefore, the cross-sectional area ratio R can be calculated as $11 \div 13 \approx 0.8$.

Similarly, the cross-sectional area ratio R of the sample M is $12 \div (3+9) = 1.0$, and the cross-sectional area ratio R of the sample O is $14 \div (3+7) = 1.4$.

Since "optical fiber exposure" shown in Table 2 is the same as that in Table 1, the explanation is omitted.

As shown in Table 2, with respect to the sample L with a cross-sectional area ratio R of 0.8, the "optical fiber exposure" is bad. This is because the cross-sectional areas of the optical fiber units 20 constituting the outermost aggregate layer L3 is small and it is not possible to sufficiently cover the inner aggregate layers L1 and L2.

With respect to the sample P with a cross-sectional area ratio R of 1.7, the "optical fiber exposure" is bad. This is because the volume (cross-sectional area) of the outermost aggregate layer L3 is excessively large for the aggregate layers L1 and L2 located inside the outermost aggregate layer L3, and the state of the core 2 is unbalanced. More specifically, in a case where the number of optical fiber units 20C constituting the outermost aggregate layer L3 is excessively large, the inner diameter of the outermost aggregate layer L3 becomes excessively large, and a gap (cavity) is formed between the inner aggregate layers L1 and L2. As a result, it is difficult to maintain the twist of the aggregate layers L1 and L2 by the outermost aggregate layer L3, so the aggregate layers L1 and L2 are untwisted, and the optical fiber units 20A and 20B included in the aggregate layers L1 and L2 are likely to be exposed through the gap between the optical fiber units 20C.

On the other hand, for the samples M to O with cross-sectional area ratios R of 1.0 to 1.4, the result of "optical fiber exposure" is good. This is because the cross-sectional areas of the optical fiber units 20 constituting the outermost aggregate layer L3 are sufficient to cover the inner aggregate layers L1 and L2.

From the above results, the cross-sectional area ratio R (the value of Ao÷Ai) may be 1.0 or more and 1.4 or less.

It should be noted that the technical scope of the present invention is not limited to the above-described embodiments, and various modifications can be made without departing from the spirit of the present invention.

For example, according to the embodiments described above, in the transverse cross-sectional view, the first direction S1 is the clockwise rotation and the second direction S2 is the counterclockwise rotation. However, this relationship may be reversed. In other words, the same effect can be achieved, even in a case where the second direction S1 is the counterclockwise rotation and the second direction S2 is the clockwise rotation.

Further, the number of optical fiber units 20 included in the aggregate layers L1 to L3 may be appropriately changed.

Further, according to the embodiments described above, the core 2 has three aggregate layers L1 to L3, but the core 2 may have four or more aggregate layers.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1A, 1B, 1C: optical fiber cable
2: core
20A: first optical fiber unit
20B: second optical fiber unit
20C: third optical fiber unit
21: optical fiber
L1: first aggregate layer
L2: second aggregate layer
L3: third aggregate layer
4: sheath
S1: first direction
S2: second direction
P: twist pitch

What is claimed is:

1. An optical fiber cable comprising:
a first aggregate layer comprising first optical fiber units that are helically twisted together in a first direction, wherein
each of the first optical fiber units comprises optical fibers twisted together in a second direction,
the first direction is different from the second direction,
a cycle of a first revolution in which the first optical fiber units revolve around a central axis of the first aggregate layer is equal to a cycle of a first rotation in which each of the first optical fiber units is twisted around a central axis of each of the first optical fiber units, and
a direction of the first revolution is the same as a direction of the first rotation.

2. The optical fiber cable according to claim 1, further comprising:
a second aggregate layer that surrounds the first aggregate layer, wherein
the second aggregate layer comprises second optical fiber units that are helically twisted together in the first direction,
each of the second optical fiber units comprises optical fibers twisted together in the second direction,
a cycle of a second revolution in which the second optical fiber units revolve around a central axis of the second aggregate layer is equal to a cycle of a second rotation in which each of the second optical fiber units is twisted around a central axis of each of the second optical fiber units, and
a direction of the second revolution is the same as a direction of the second rotation.

3. The optical fiber cable according to claim 1, further comprising:
a second aggregate layer that surrounds the first aggregate layer, wherein
the second aggregate layer comprises second optical fiber units that are helically twisted together in the first direction,
a twist pitch of the first optical fiber units is equal to a twist pitch of the second optical fiber units,
a cycle of a second revolution in which the second optical fiber units revolve around a central axis of the second aggregate layer is equal to a cycle of a second rotation in which each of the second optical fiber units is twisted around a central axis of each of the second optical fiber units, and
a direction of the second revolution is the same as a direction of the second rotation.

4. The optical fiber cable according to claim 1, further comprising:
a plurality of first aggregate layers that each comprise the first optical fiber units, wherein
in a transverse cross-sectional view of the optical fiber cable, a value of Ao÷Ai is greater than or equal to 1.0 and less than or equal to 1.4, where:
Ao is a sum of cross-sectional areas of the first optical fiber units in an outermost aggregate layer located on a radially outermost side of the first aggregate layers, and
Ai is a sum of cross-sectional areas of the first optical fiber units in the first aggregate layers other than the outermost aggregate layer.

* * * * *